Figure 1:
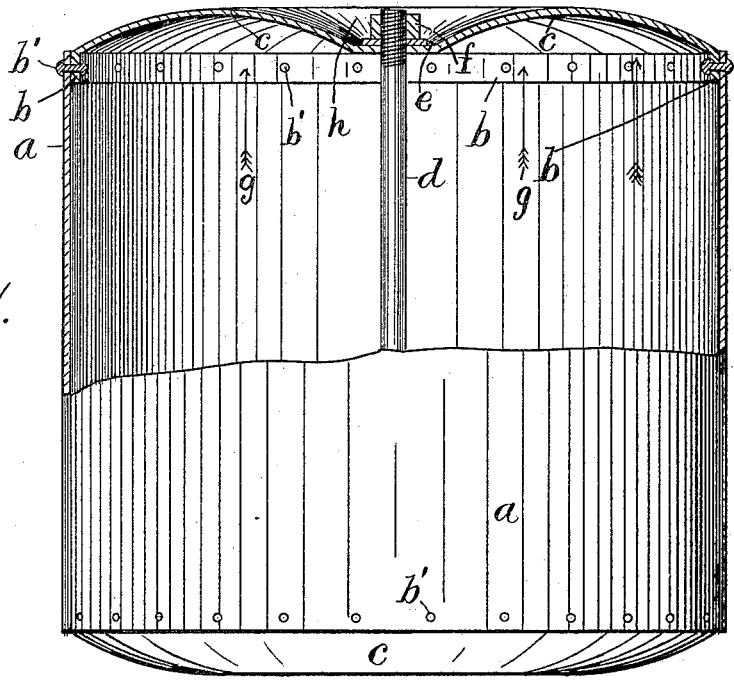

(No Model.) 2 Sheets—Sheet 1.
J. W. HYATT.
HEAD FOR PRESSURE RESERVOIRS.

No. 445,180. Patented Jan. 27, 1891.

(No Model.)  2 Sheets—Sheet 2.
J. W. HYATT.
HEAD FOR PRESSURE RESERVOIRS.
No. 445,180.  Patented Jan. 27, 1891.
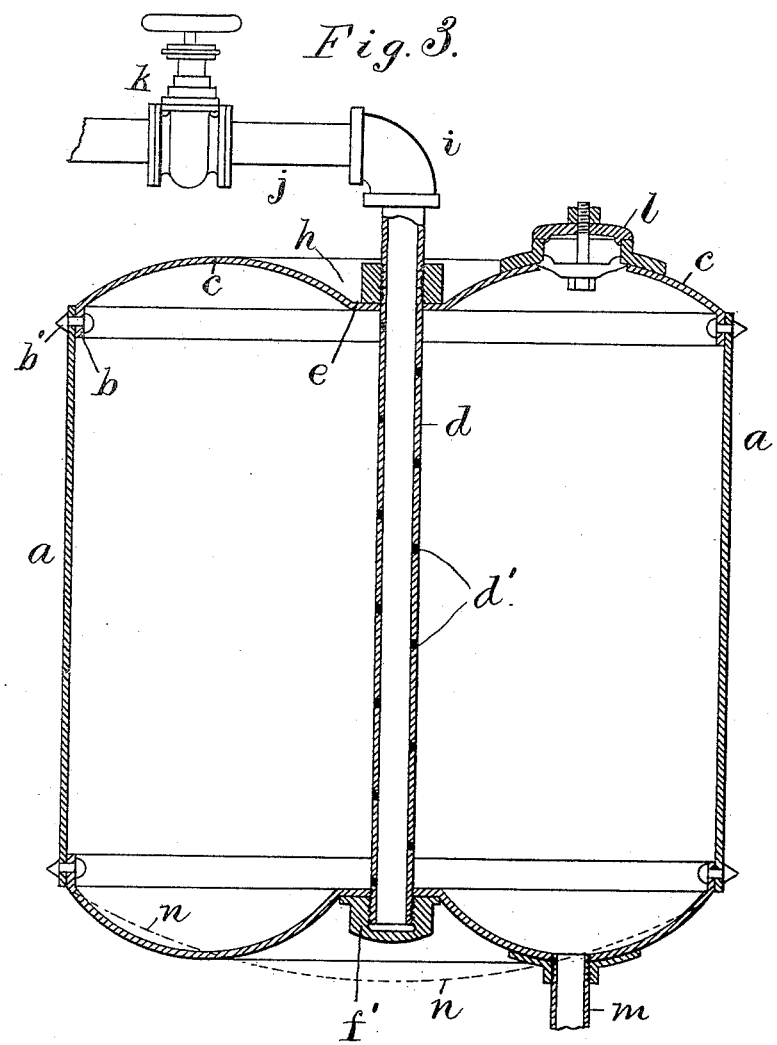
Attest:
L. Lee
J. Van herff
Inventor.
John W. Hyatt, per
Crane & Miller, attys

UNITED STATES PATENT OFFICE.

JOHN W. HYATT, OF NEWARK, NEW JERSEY.

HEAD FOR PRESSURE-RESERVOIRS.

SPECIFICATION forming part of Letters Patent No. 445,180, dated January 27, 1891.

Application filed May 12, 1890. Serial No. 351,425. (No model.)

*To all whom it may concern:*

Be it known that I, JOHN W. HYATT, a citizen of the United States, residing at Newark, Essex county, New Jersey, have invented certain new and useful Improvements in Heads for Pressure-Reservoirs, fully described and represented in the following specification and the accompanying drawings, forming a part of the same.

The object of this invention is to furnish a a cheap and effective means of resisting the internal strain at the closed ends of large pressure-reservoirs, as boilers, tanks, and filters.

Heretofore it has been common in constructions where a number of stay-rods could not conveniently be used to form the heads of boilers or tanks convex toward the center in a regular spherical curve; but I have found by extended experience that the ordinary curve given to such heads—that is, an arc of sixty degrees—is not suited to withstand the internal strain upon heads of large diameter—namely, from six to twelve feet in diameter. With such dimensions it would require a curve of much greater projection, or a thickness of metal much greater than that found in practice, to enable such heads to stand a pressure of two hundred pounds per square inch. As the convexity is formed in such "bumped" heads by pressing them when hot from a flat sheet, an increase in either the convexity or the thickness would entail great additional expense, while a greater projection would be very inconvenient in vessels that rest upon their ends. An excesss of pressure upon a bumped head bulges it in the center and draws the edges inward, rupturing the rivets by which it is secured to the shell, and additional strength can only be secured by the expensive means referred to above. To obviate such expense and to greatly increase the resisting-power of a head of given thickness, I form a depression in the center of the head to produce an annular convexity and a portion sloped outwardly from the center to operate, when under pressure, in distending the head. Such distention counterbalances the inward strain at the margin. In large constructions I provide a flat seat in the central recess and insert a stay-rod through the heads, with a nut or collar bearing upon the outside of such seat. A single stay-rod applied through the center of the vessel does not involve the penetration of the shell at any point and does not interfere with the use of the vessel for most purposes.

The invention will be understood by reference to the annexed drawings, in which—

Figure 2:
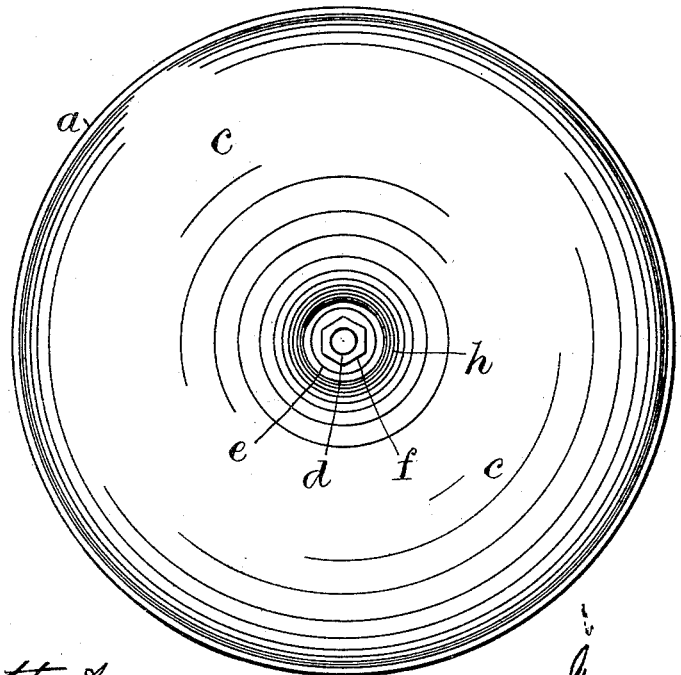

Figure 1 is an elevation of a filter-tank, partly in section at the center line, where hatched; and Fig. 2 is a plan of the same. Fig. Fig. 3 shows a modification.

$a$ is the shell of the tank; $b$, the flange by which the head is secured to the end of the shell by rivets $b'$; $c$, the annular convexity formed concentric with the center of the head, through which the stay-rod $d$ is inserted, and $h$ the central recess.

A flat seat $e$ is formed in the center of the head to receive the nut or collar $f$ upon the stay-rod, and the convex curve extends from the flange $b$ to the seat $e$, with a projection of nearly equal height above both.

The strain within the head is indicated by arrows $g$, and it is demonstrable that the stay-rod sustains one-fourth the internal pressure upon the head, by which its dimensions and strength may be readily determined. The height of the curve in the annular convexity $c$ is less than would be required in a bumped head of the same diameter and sixty degrees curvature, so that the labor and expense of forming such convexity are no greater than would be required to make such bumped head. The new construction is much stiffer in form than a bumped head, as the length of the curve is very much less and the annular disposition of the projection imparts a great resistance to flexure in every direction.

The seat $e$ may be made of any size that can be properly sustained by a nut, collar, or large washer, and the chord of the curve thus becomes much less than one-half the chord of a bumped head for the same shell.

It will be readily perceived that the recess $h$ forms a projection of truncated cone shape upon the inside of the head, which can only be forced outward by pressing the annular convexity toward the flange $b$. The tendency of the center part to thrust outward thus neutralizes the tendency of the pressure to draw the flange inward. With the annular convexity and the same thickness of metal as would be used in a bumped head, the head having a recess in the center possesses much greater strength and has no tendency to draw the flange b from the rivets b'. The heads may thus be made enough lighter than a bumped head to fully cover the expense of the stay-rod d. The ridge of the annular convexity, to which the letter c is applied in Fig. 1, is adapted for support upon a flat surface, and such form of head is therefore much better adapted for tanks and filters which rest upon a flat foundation than a bumped head, which is highest in the center.

The nut or head upon the stay-rod is inclosed in the recess at the center of the convexity, and does not therefore interfere with the setting of the vessel upon a flat foundation. Such form for the head is readily imparted to a sheet of boiler-plate when heated by dies or swages, and such heads may thus be readily made for tanks or filters of large diameter.

The modification in Fig. 3 shows a tubular stay-rod with perforations d' inside the reservoir and external pipe-connections by which fluid may be circulated through the stay-rod. Such a construction is very useful in many kinds of boiler-vessels or digesters and may also be employed for introducing fluid within the axis of a rotating drum having heads constructed according to my invention.

In Fig. 3 the stay-rod is shown formed from a piece of strong pipe, with nuts applied to its opposite ends and perforated within the reservoir to permit the escape of fluid to or from the pipe by holes d'. The nut upon one end of the pipe is shown formed as a cap f' to prevent the passage of fluid, while the opposite end of the pipe is provided with an elbow i, to which is connected a branch pipe j with a cock k therein. A man-hole l is shown at one end of the reservoir, and an outlet-pipe m at the opposite end. Such features are illustrated to show a vessel adapted for the boiling of various substances, the outlet m being closed during the boiling operation, the materials to be boiled being inserted through the man-hole l, and the steam required being introduced through the hollow stay-rod. In the case of a rotary drum the hollow stay-rod may have pipe-connections at both ends, if required.

It is well known that a hemispherical head upon the end of a cylindrical shell produces no strain upon the shell except a longitudinal tension, and such a curve would therefore be the best for practical use, but that its extreme convexity is difficult to produce and of very inconvenient form.

In a bumped head an excess of pressure tends to loosen the joint with the shell by drawing the edges of the head inward, and such tendency is greatly diminished by increasing the convexity of the head—that is, diminishing its radius. The annular convexity used in my invention answers these conditions very nearly, as it may be formed with a short radius and yet avoid the excessive projection and inconvenient form of a high bumped head. A dotted line n is shown at the lower end of Fig. 3 to indicate the convexity of a sixty-degree bumped head upon a similar reservoir. The annular convexity at the same end of the boiler is drawn with a radius only one-quarter as great as the radius of the dotted line, and yet it will be seen that the protuberance of the annular convexity is less than that of a bumped head indicated by the dotted line, while the strength of such an annular convex head is very much greater with the same thickness of metal. The annular convexity may be made of semicircular cross-section, if desired, and in such case would theoretically impose no strain upon the shell except in the direction of its axis. The shell would thus be subjected to a uniform tension throughout, and its strength could be better calculated and proportioned to endure the resistance imposed than when the head operates to modify such resistance.

By my invention the chord of the arch upon which the pressure operates is shortened so greatly that cast-iron may frequently be substituted for rolled metal plates in forming the heads. The use of such material offers a very great advantage in cases where no shops or tools exist for making a bumped head of large diameter. Such shops are comparatively rare, while any foundry of ordinary capacity can make a casting of suitable dimensions in accordance with my invention.

I am aware that a fruit-can has been constructed heretofore with a concave head having an annular corrugation near its rim and secured upon the cylindrical shell only by a bolt connecting the center of the same with that of the opposite head and passing through the can, as shown in United States Patent No. 18,035, dated August 25, 1857. My invention differs from such construction in having the heads each provided with an annular convexity intermediate to its center and its periphery, and in having the heads secured rigidly to the edges of the cylindrical shell.

Having thus set forth the invention, what is claimed herein is—

1. The combination, in a pressure-reservoir, of a cylindrical shell, heads secured to the same at their peripheries and formed each with an annular convexity and a central depression, and a stay-rod inserted through the centers of such heads with a bearing in such depressions, substantially as herein set forth.

2. The combination, in a pressure-reservoir, of a cylindrical shell, heads secured to the same at their peripheries and formed each with an annular convexity and a central depression, seats in the bottoms of such depressions, and a hollow stay-rod inserted through the centers of such heads with a bearing upon such seats, and the stay-rod being provided with apertures between the heads, as and for the purpose set forth.

In testimony whereof I have hereunto set my hand in the presence of two subscribing witnesses.

JOHN W. HYATT.

Witnesses:
THOS. S. CRANE,
L. LEE.